US 7,965,448 B2

(12) United States Patent
Maekawa

(10) Patent No.: US 7,965,448 B2
(45) Date of Patent: Jun. 21, 2011

(54) FLOATING IMAGE INTERACTION DEVICE AND ITS PROGRAM

(75) Inventor: Satoshi Maekawa, Tokyo (JP)

(73) Assignee: National Institute of Information and Communication Technology, Koganei-shi (JP)

( * ) Notice: Subject to any disclaimer, the term of this patent is extended or adjusted under 35 U.S.C. 154(b) by 0 days.

(21) Appl. No.: 12/665,762

(22) PCT Filed: Jun. 20, 2008

(86) PCT No.: PCT/JP2008/061310
§ 371 (c)(1), (2), (4) Date: Dec. 21, 2009

(87) PCT Pub. No.: WO2008/156163
PCT Pub. Date: Dec. 24, 2008

(65) Prior Publication Data
US 2010/0177402 A1    Jul. 15, 2010

(30) Foreign Application Priority Data

Jun. 21, 2007   (JP) ................. 2007-163323
Aug. 15, 2007   (JP) ................. 2007-211992

(51) Int. Cl.
G02B 27/14      (2006.01)
(52) U.S. Cl. ..................... 359/629; 359/636
(58) Field of Classification Search ........... 359/629, 359/636
See application file for complete search history.

(56) References Cited

U.S. PATENT DOCUMENTS

| | | | |
|---|---|---|---|
| 4,509,837 A | 4/1985 | Kassies | |
| 5,237,164 A * | 8/1993 | Takada | ............. 235/487 |
| 5,583,695 A | 12/1996 | Dobrusskin | |
| 5,764,411 A | 6/1998 | Shanks et al. | |
| 5,861,993 A | 1/1999 | Shanks et al. | |
| 6,204,973 B1 | 3/2001 | Holden | |
| 6,467,913 B1 | 10/2002 | Holden et al. | |

(Continued)

FOREIGN PATENT DOCUMENTS

GB    2287549 A    9/1995

(Continued)

OTHER PUBLICATIONS

International Search Report of PCT/JP2008/061310, mailing date of Jul. 22, 2008.

(Continued)

*Primary Examiner* — Ricky L Mack
*Assistant Examiner* — James C Jones
(74) *Attorney, Agent, or Firm* — Westerman, Hattori, Daniels & Adrian, LLP

(57) ABSTRACT

A real mirror image forming optical system is constructed from a half-mirror, and from a retroreflector placed in a position where it recursively reflects either the light passing through or reflected by that half-mirror, so that light emitted from an object to be projected placed behind the half-mirror can pass through either a first light path consisting of passing through the half-mirror, recursive reflection by the retroreflector, and reflection by the half-mirror; or a second light path consisting of reflection by the half-mirror, recursive reflection by the retroreflector, and passing through the half-mirror; thus by one or both of these light paths a real mirror image of the object to be projected is formed at a planar symmetric position with respect to the half-mirror surface.

11 Claims, 9 Drawing Sheets

U.S. PATENT DOCUMENTS

2007/0140695 A1* 6/2007 Suzuki et al. .................. 398/79

FOREIGN PATENT DOCUMENTS

| | | |
|---|---|---|
| JP | 59-500189 A | 2/1984 |
| JP | 4-339488 A | 11/1992 |
| JP | 9-506717 A | 6/1997 |
| JP | 2000-352695 A | 12/2000 |
| JP | 2001-511915 A | 8/2001 |
| JP | 2002-517779 A | 6/2002 |
| JP | 2006-080009 A | 3/2006 |
| WO | 2007/116639 A1 | 10/2007 |

OTHER PUBLICATIONS

Chinese Office Action dated Oct. 19, 2010, issued in corresponding Chinese Patent Application No. 200880021097.7.

* cited by examiner

Fig.1
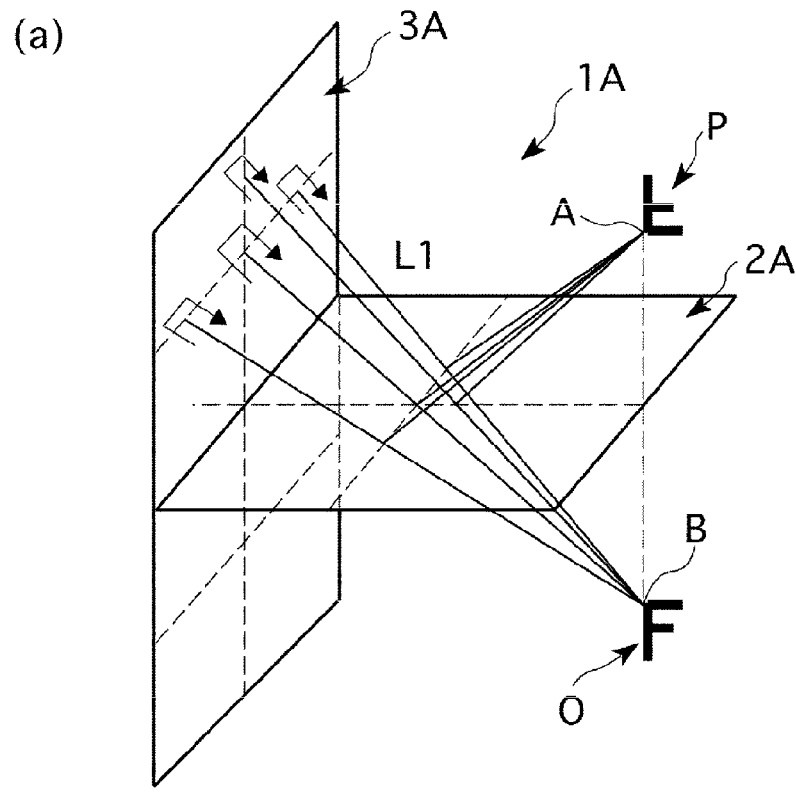
(a)
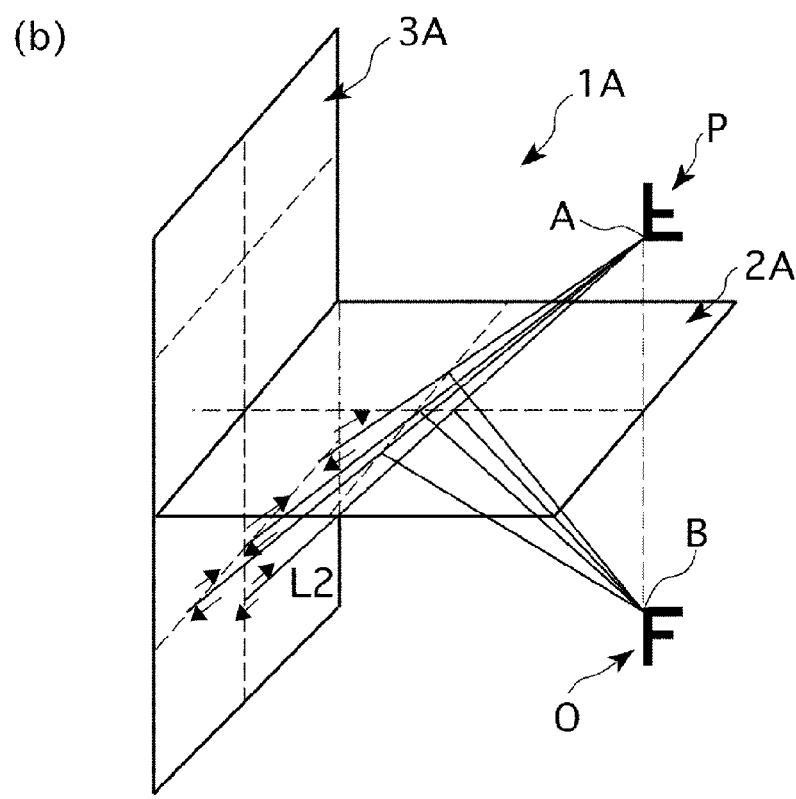
(b)

Fig.6
(a)
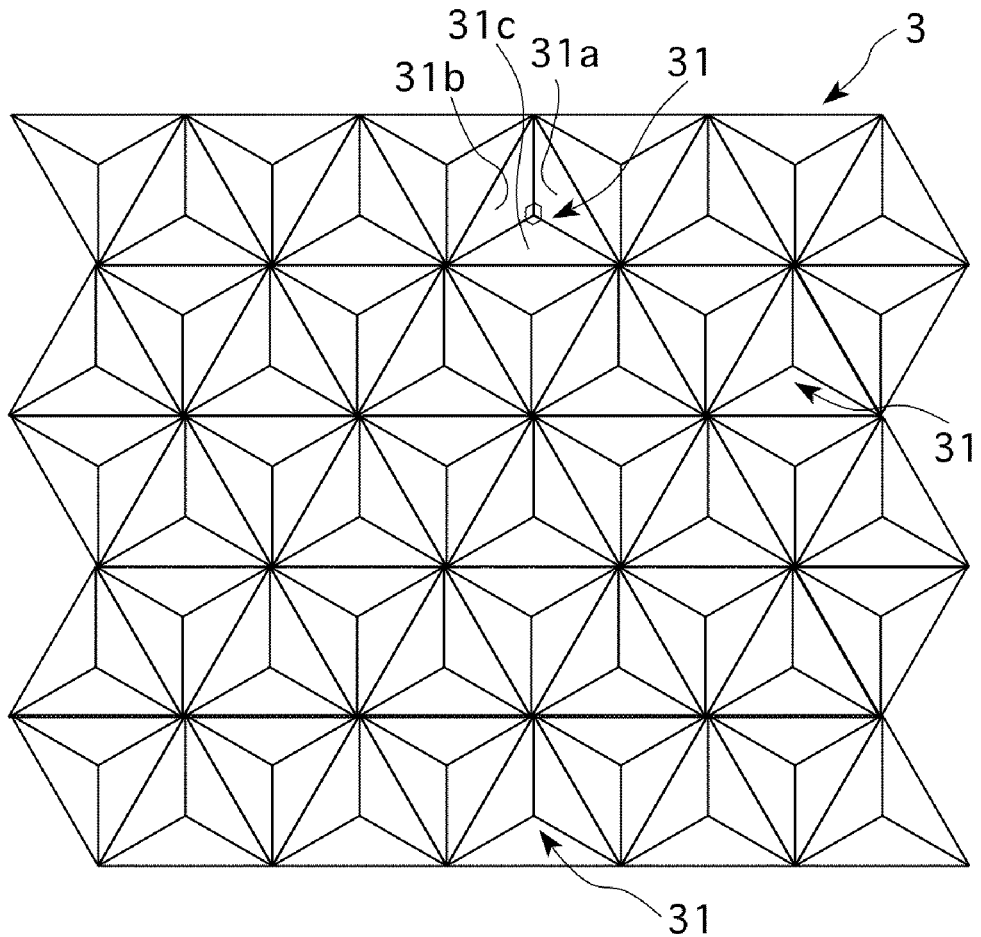
(b)
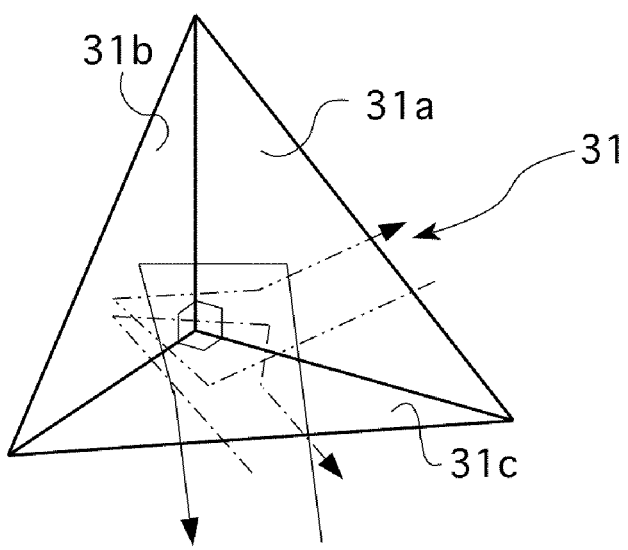

Fig.7
(a)
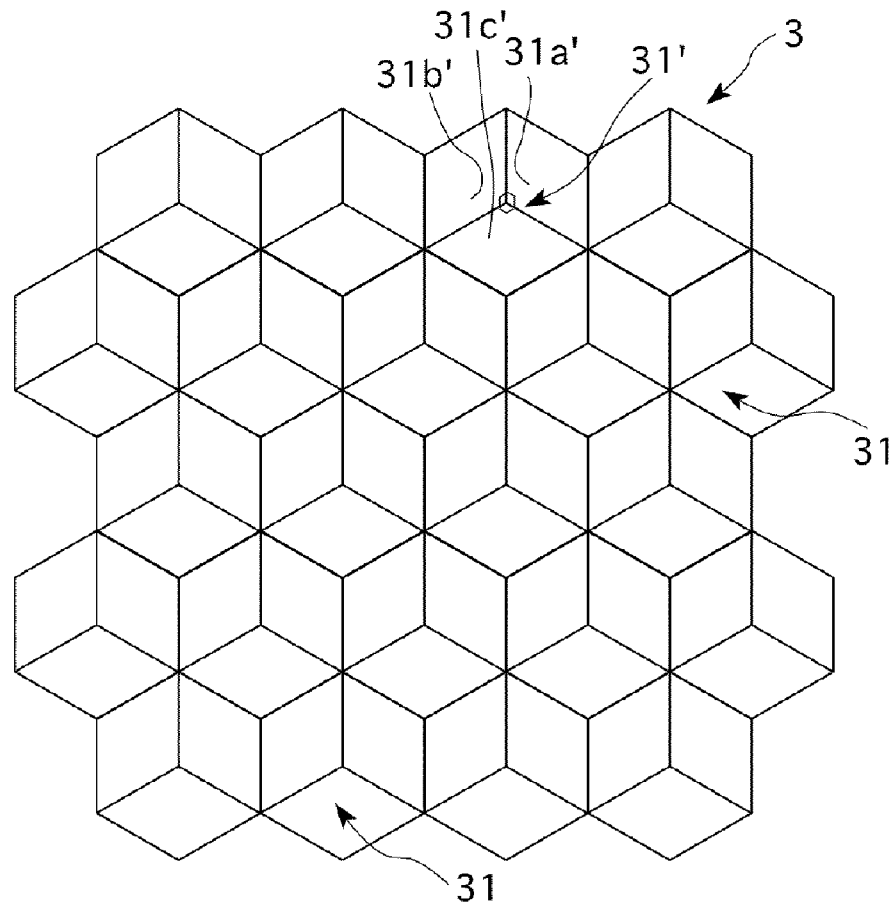
(b)
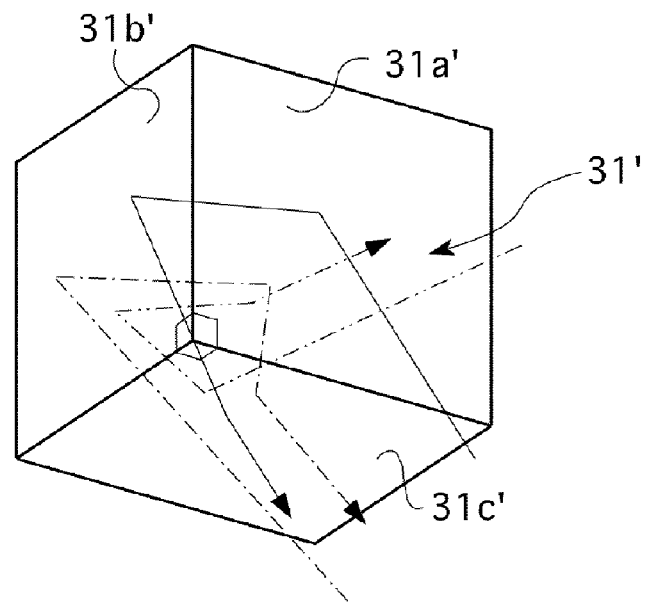

Fig.8
(a)
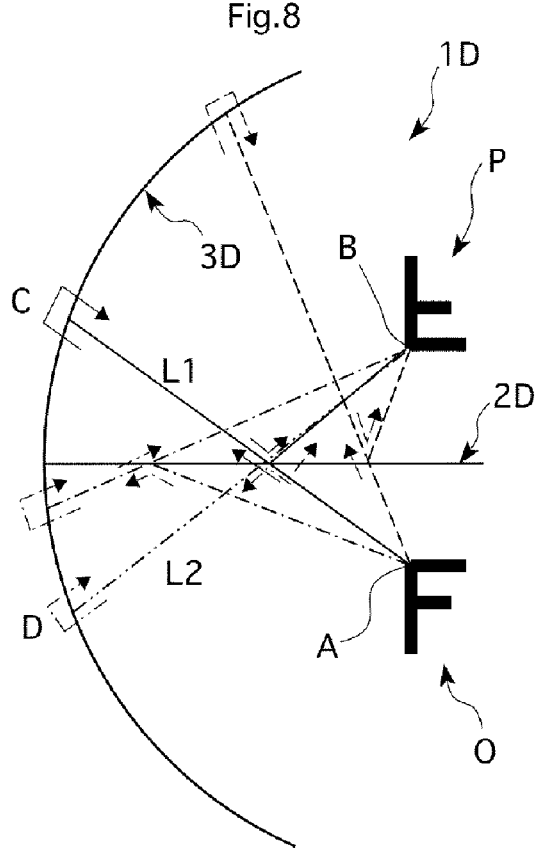
(b)
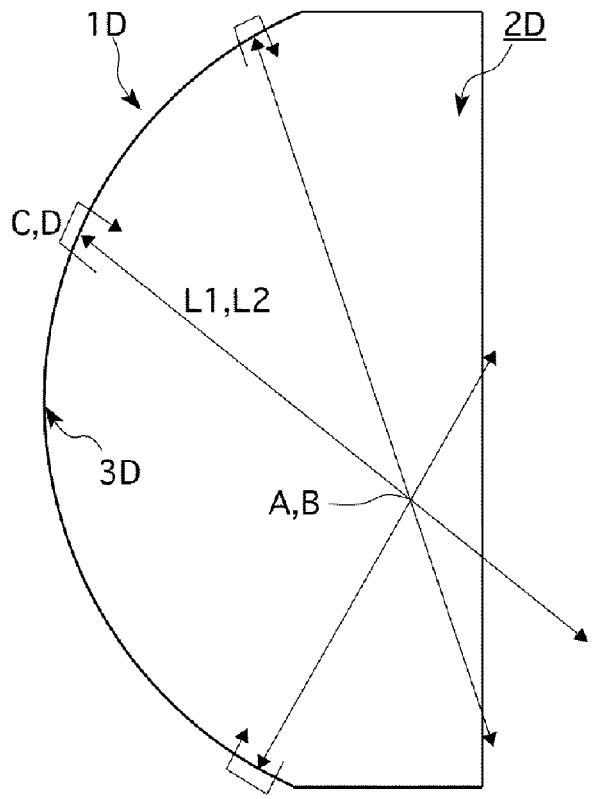

FLOATING IMAGE INTERACTION DEVICE AND ITS PROGRAM

FIELD OF THE INVENTION

The present invention is related to an optical system that is capable of forming the real image of an object to be projected, whether it is a physical object or a displayed image.

BACKGROUND OF THE INVENTION

The present inventor has proposed a real mirror image forming optical device using a dihedral corner reflector array, consisting of a large number of dihedral corner reflectors constructed from pairs of mutually perpendicular specular surfaces, and capable of forming the real image of an object to be projected, that can be a two-dimensional or three-dimensional physical object or a displayed image (see for example Patent Reference 1). This device has dihedral corner reflectors consisting of two mutually perpendicular specular surfaces arranged approximately perpendicularly to the optical device plane, so that the light emitted from the object to be projected that is placed to one side of the optical device is reflected once from each of the above-mentioned specular surfaces while passing through the optical device plane, thus forming a real image (real mirror image) of the object to be projected in a planar symmetric position.
Patent Reference No. 1: JP 2006-080009

SUMMARY OF THE INVENTION

Problems to be Solved by the Invention

The above-mentioned real mirror image forming optical device using dihedral corner reflectors is capable of forming two-dimensional real mirror images of two-dimensional objects and three-dimensional real mirror images of three-dimensional objects without distortions, while the optical device itself can be made in a compact and thin shape, thus representing an advance in the art. However, as for the problems associated with the above-mentioned real mirror image forming optical device, insofar as it requires the forming of specular surfaces perpendicularly to the optical device plane, there is a need to develop a manufacturing process capable of maintaining the required high precision while keeping costs low; furthermore, this device has a narrow angle of visibility.

So in light of these challenges, the present invention uses optical elements that are easier to manufacture and can be used in any position, thereby providing a new optical system capable of forming the real mirror image of an object to be projected.

SUMMARY OF THE INVENTION

Problems to be Solved by the Invention

The present invention involves an optical system that makes use of a half-mirror, and a retroreflector consisting of a set of unit retroreflective elements and placed in such a position where the light transmitted through the half-mirror is recursively reflected by it and with a first optical path that arises when the light emitted from an object to be projected which is placed under the back side of the half-mirror passes through the half-mirror, then that light is recursively reflected by the above-mentioned retroreflective elements at the front side, and finally reflected from the front side of the half-mirror; and with a second optical path that arises when the light emitted from an object to be projected which is placed under the back side of the is reflected from the back side of the half-mirror, then that light is recursively reflected by the above-mentioned retroreflective elements at the back side, and finally passes through the half-mirror; one or both of those optical paths are selected so that the real mirror image of the above-mentioned object to be projected is formed at a planar symmetric position with respect to the half-mirror.

In the present invention, 'Retroreflective' means that the incident light is reflected in the incident direction (reversely reflected), thus the incident light and the reflected light are parallel and in opposite directions. If the retroreflective elements are sufficiently small, the incident and reflected optical paths can be considered overlapping. In the present invention a set of such retroreflective elements is called a retroreflector, however, for a retroreflector it is not necessary that all of the retroreflective elements are arranged along a single surface, but each retroreflective element might be scattered in a three-dimensional arrangement. In addition, the 'half-mirror' used in the present invention means an optical device having the ability to both transmit and reflect light, preferably having a ratio of transmittance to reflectance near to an ideal 1:1.

In case of an optical system according to the present invention, the light emitted from the object to be projected might pass along a first optical path consisting of passing through the half-mirror, then being recursively reflected by each retroreflective elements, then being reflected from the half-mirror; or along a second optical path consisting of being reflected from the half-mirror, then being recursively reflected by each retroreflective elements, then passing through the half-mirror; with the ability of forming the real mirror image of the object to be projected at a planar symmetric position with respect to the half-mirror, whichever of those optical paths having been selected. Image forming is possible by using both of the first and second optical paths, or by using only one of them; however, when only one of the two optical paths is used, the brightness of the real mirror image (defined as a transparency ratio) will become about half as compared with the case of using both optical paths.

Furthermore, in order that the retroreflective elements have the ability to recursively reflect the incident light, so far as the retroreflective elements are placed so that they take part in either of the above-mentioned first or second optical paths, their placement can otherwise be arbitrary, and as stated above, they might be spread out in three dimensions. In this case, however, in order to reliably obtain the recursive reflection of light coming from various directions, an excessively large number of retroreflective elements would become necessary; thus from the point of view of easy manufacturing of the retroreflective elements, it is advantageous to arrange each retroreflective element along a common curved surface or in a common plane.

In particular, when the retroreflector is made into a curved surface, it becomes possible to obtain an approximately perpendicular angle between the incident light and the plane of reflection of the optical device at any position, thus maintaining a high reflectivity for the device. Retroreflectors have the property that when light arrives at an acute angle with respect to the plane of reflection of the device, the efficiency of reflection becomes lower, thus for instance in the case of the retroreflector having a planar shape, the light incidence at the top part of the device becomes slanted, therefore the observed image in that part appears darker. Furthermore, by making the retroreflector into a curved surface so that the retroreflective elements are placed surrounding the formed real mirror image, a very wide viewing angle can be obtained. It should be noted that even when the retroreflector is in a curved shape, as far as each retroreflective element is capable of precise recursive reflection, there will be no appreciable deterioration in the formed image, thus it is possible to design the curved shape freely as desired.

Furthermore, since it is possible to achieve forming a real mirror image at a planar symmetric position with respect to the half-mirror surface by using at least either the first or the second optical path as described above, it is sufficient to arrange the retroreflective elements in either the front or the back of the half-mirror; so that when the retroreflective elements are placed in the front, the first optical path will be used, while when the retroreflective elements are placed in the back, the second optical path will be used. When both optical paths are to be used in order to get a more bright real mirror image, the retroreflective elements should be placed both in the front and the back. Furthermore, in the case when retroreflectors are located both on the front and the back of the half-mirror, it is not necessary for them to be arranged along the same single surface, irrespective of whether that surface is a plane or curved; for instance, when the retroreflectors are in the shape of retroreflective elements arranged along planes, the retroreflectors might be placed to the side of the half-mirror in a bent posture, at an angle less than 180 degrees.

In order to prevent the observer from viewing the object to be projected directly through the half-mirror, it is advantageous to install a shading means to shade the area of observation from the half-mirror outside of the first and second optical paths. The most simple way of constructing such a shading means is by placing a shading plate made of some opaque material on the surface of the half-mirror, into the area where the object to be projected would be visible by the observer through the half-mirror.

At the same time, in order to allow viewing the real mirror image of the object to be projected from various perspectives, it is desirable to surround by the retroreflector the object to be projected together with the half-mirror from at least the back side of the half-mirror in a three-dimensional manner. When aiming at achieving the capability of visibility from multiple viewpoints for the real mirror image forming optical system in such a way, by enveloping the object to be projected by the half-mirror and by the retroreflector placed to its back side as explained above, when the light emitted by the object to be projected is reflected from the half-mirror, so far as it is not blocked by the object to be projected itself, it will always be recursively reflected from the retroreflector, then transmitted through the half-mirror, thus forming a real mirror image at a planar symmetric position with respect to the half-mirror surface. Thus by using at least the second optical path for imaging, the real mirror image will be observable from nearly all directions at the front side of the half-mirror. It should be noted that since the light emitted from the object to be projected and reflected from the half-mirror will not reach the place directly under the object to be projected, the retroreflective elements might be omitted in those positions. Furthermore, while it will cause some restrictions on the viewing positions, by arranging retroreflective elements in some positions at the front side of the half-mirror, the first optical path will also be used for imaging, thus the brightness of the real mirror image might be improved.

Also, in addition to the above-mentioned light shielding means, to prevent the object to be projected becoming directly visible through the half-mirror, a visibility control means that blocks or diffuses light transmission in specific directions might be installed at the surface of the half-mirror, so that light rays, coming directly from the object to be projected through the half-mirror to positions on the front side of the half-mirror where the real mirror image of the object to be projected are observed, will be blocked by this visibility control means. In this way, it will become possible for the observer to view only the floating real mirror image without observing directly the object to be projected under the half-mirror. As concrete examples of the visibility control means, visibility control films that disperse only light in certain directions (for instance, 'Lumisty' (a product of Sumitomo Chemical Co., Ltd., Japan) or visible angle control films that block only light rays in certain directions (for example, 'Light Control Film' (a product of Sumitomo 3M Co., Ltd.)) or other such optical films might be used. In particular, for the case of the above-mentioned real mirror image forming optical system that is designed for multiple viewpoint observation, the above-mentioned shading means cannot be used, thus such visibility control means will be suitable.

As an example of a retroreflective element that is easy to manufacture, we can mention the retroreflective element that consists of three adjacent mirror surfaces (in the broad sense called 'corner reflector'). In this case, since each mirror belonging to a retroreflective element will be located at an angle, the manufacturing difficulties arising with perpendicularly located mirror surfaces in case of the earlier mentioned dihedral corner reflector can be avoided, and lower-cost manufacturing becomes possible. For instance, when the three mirrors constituting the retroreflective elements are manufactured by electroforming or resin forming, as each of the three mirror surfaces will have a slanting angle, that will ensure easy separation from the mold, and allows particularly easy manufacturing of the device.

More specifically, a corner cube consisting of three mutually orthogonal adjacent mirror surfaces might be used for such unit retroreflective elements. By a corner cube here we mean the geometry using one inner corner of a cube, and by making the three surfaces around the corner into mirror surfaces, they can be made to function as a recursive reflector (retroreflector).

Furthermore, in addition to corner cubes, it is possible to use as unit retroreflective elements three adjacent mirror surfaces, with two of them at an angle of 90 degrees, while the third one having an angle of 90/N degrees (here N is an integer number); or three mirror surfaces having mutual angles of 90 degrees, 60 degrees, and 45 degrees.

Furthermore, when the three mirror surfaces constituting each unit retroreflective element are pointing in the same direction in case of each unit retroreflective element, there is a possibility of image forming to occur due to single or double reflections; to prevent this, it is possible to turn the three mirror surfaces constituting the unit retroreflective elements into various directions for each unit retroreflective elements, while maintaining their mutual angular position inside each unit retroreflective element.

Besides those retroreflectors mentioned above that use mirrors, for instance cat's eye reflectors, or other unit retroreflective elements might be used, as far as they are capable of recursively reflecting the incident light.

Effects Achieved by the Invention

When using the real mirror image forming optical system of the present invention, by the effective use of a half-mirror capable of both transmitting and reflecting light, and of a retroreflector capable of recursively reflecting incident light, the real mirror image of an object to be projected placed to one side of the half-mirror will be formed in a planar symmetric position with respect to the half-mirror surface, observable from a wide region of viewing angles; depending on the pattern of placement of the retroreflector, visibility can be achieved from practically the whole front surface of the half-mirror. Furthermore, by using an optical element consisting of three mirror surfaces as the unit retroreflective element (as a broad concept including the corner cube, here called 'corner reflector'), it becomes easy to manufacture the retroreflector and the real mirror image forming optical system.

BRIEF DESCRIPTION OF THE DRAWINGS

FIG. 1 is a drawing showing the principle of one embodiment of the real mirror image forming optical system of the present invention.

FIG. 6 is a drawing showing an example of the retroreflective elements used in the above-mentioned real mirror image forming optical system.

FIG. 7 is a drawing showing another example of the retroreflective elements used in the above-mentioned real mirror image forming optical system.

FIG. 8 is a drawing showing still another example of the retroreflective elements used in the above-mentioned real mirror image forming optical system.

DETAILED DESCRIPTION OF THE INVENTION

Hereinafter, the preferred embodiment of the present invention is described below with reference to the drawings.

Figure 2:
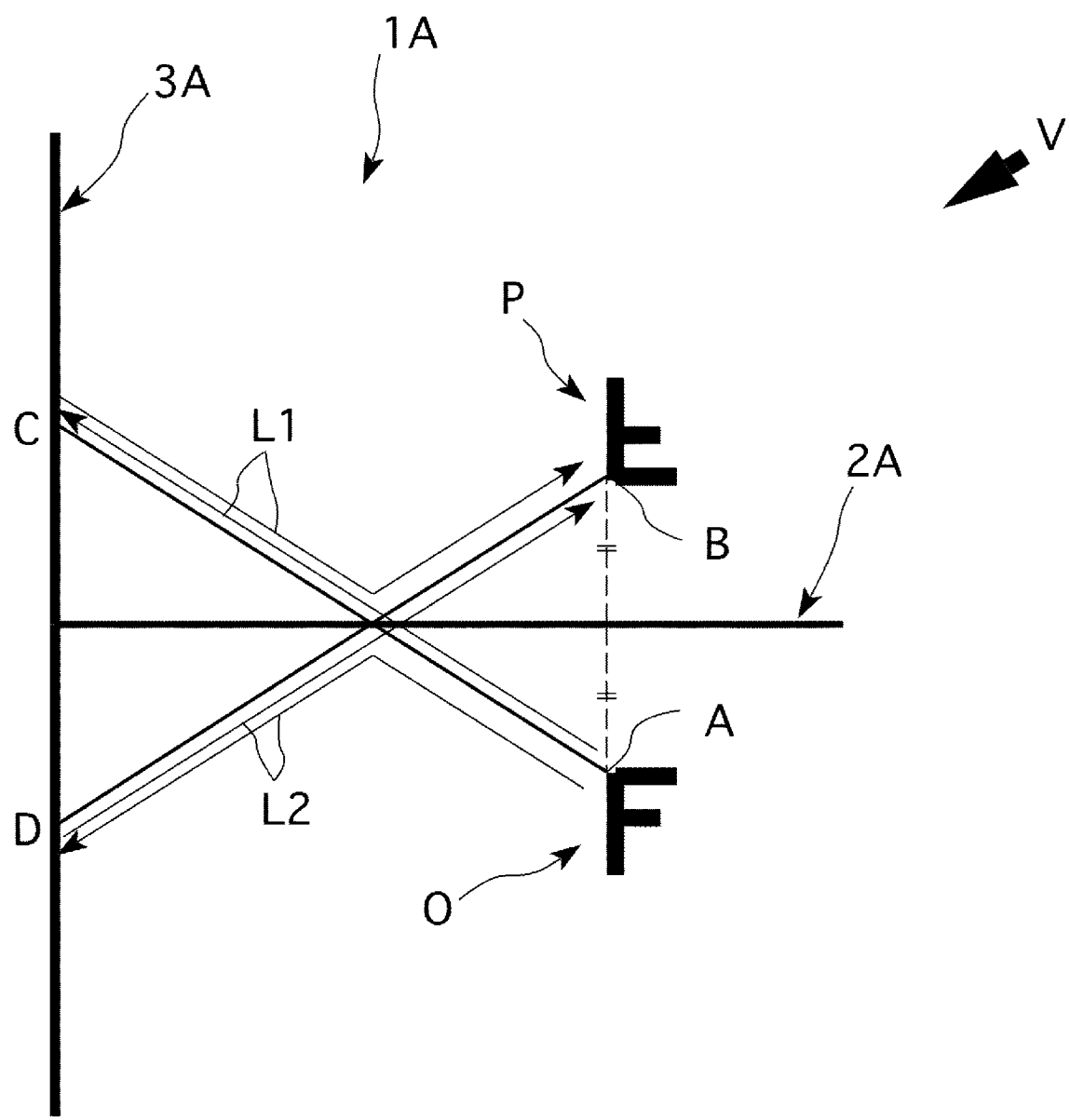
FIG. 2 is a schematic diagram of the real mirror image forming optical system viewed from the side.

FIG. 1 shows the principle of image forming in this embodiment, and FIG. 2 is a schematic diagram showing from the side the state of the light reflection and transmission for this embodiment. In the real mirror image forming optical system 1A of the present invention as shown in these drawings, a half-mirror 2A is arranged horizontally, with one retroreflector plate 3A placed to one side (the opposite side to the observer) of the half-mirror 2A in a vertical attitude, so that the half-mirror 2A and the retroreflector 3A are approximately perpendicular to each other. To one side (back side) of the half-mirror 2A, an object to be projected O consisting of a two-dimensional or three-dimensional physical object or a displayed image (an image projected to a screen) might be placed; in the example of the drawing, a shape of the letter 'F' is placed as the object to be projected O. When the object to be projected O itself is emitting light, there is no need for separate illumination, but when the object to be projected O is not a light emitter, it is necessary to provide a separate light source that illuminates the object to be projected O. In the real mirror image forming optical system 1A of the present invention, the mirror image of the object to be projected O (the real mirror image P) is formed in a planar symmetric position with respect to the half-mirror surface 2A, and it can be observed by viewing from an angle from above the half-mirror 2A. In the following, the real mirror image forming optical system, half-mirror, and retroreflector will be referred to respectively in a collective sense by the symbols 1, 2, and 3; and when it is desired to differentiate, an alphabetic letter will be added.

Since in this case the real mirror image P of the object to be projected O is formed by passing through two optical paths, we shall explain the image forming process according to the light rays emanating from the object to be projected O (the point A). In FIG. 1, (a) shows the principle of image forming in the first light path L1, while (b) shows the principle of image forming in the second light path L2. First, for the light passing through the first optical path L1, light emitted in all directions from the point A on the object to be projected O will pass through the half-mirror 2A in a straight line, then it will be recursively reflected back into the same direction from the retroreflector 3A that is protruding at the front side of the half-mirror 2A, (in FIG. 2, point C is one example of a retroreflection point), then by being further reflected from the half-mirror 2A, it will be focused again into one point B in the space at the front side of the half-mirror 2A. In other words, this focusing means image forming. This point B is in a planar symmetric position to point A with respect to the half-mirror surface 2A. Meanwhile, for the light passing through the second optical path L2, light emitted in all directions from the point A on the object to be projected O will be reflected from the half-mirror 2A, then it will be recursively reflected back into the same direction from the retroreflector 3A that is protruding at the back side of the half-mirror 2A, (in FIG. 2, point D is one example of a retroreflection point), then by passing through the half-mirror 2A in a straight line, it will be focused into the point B in the space at the front side of the half-mirror 2A. Therefore, light passing through either of the optical paths L1 and L2 will pass through the planar symmetric position of the object to be projected O with respect to the half-mirror surface 2A, forming the real mirror image P at the same position, which can be observed from the viewing point V. Here, the brightness of the real mirror image P with respect to the object to be projected O (the transmittance of light rays) is obtained for each light path by multiplying the three quantities of 'half-mirror transmittance', 'half-mirror reflectivity', and 'corner cube reflectivity'. Assuming for the moment that each of 'half-mirror transmittance' and 'half-mirror reflectivity' are 0.5 as the ideal maximum, and the 'corner cube reflectivity' is r, then the transmittance of the real mirror image P for both light paths L1 and L2 will be the same 0.25r, and for the combined total of the two light paths it will be 0.5r.

Figure 3:
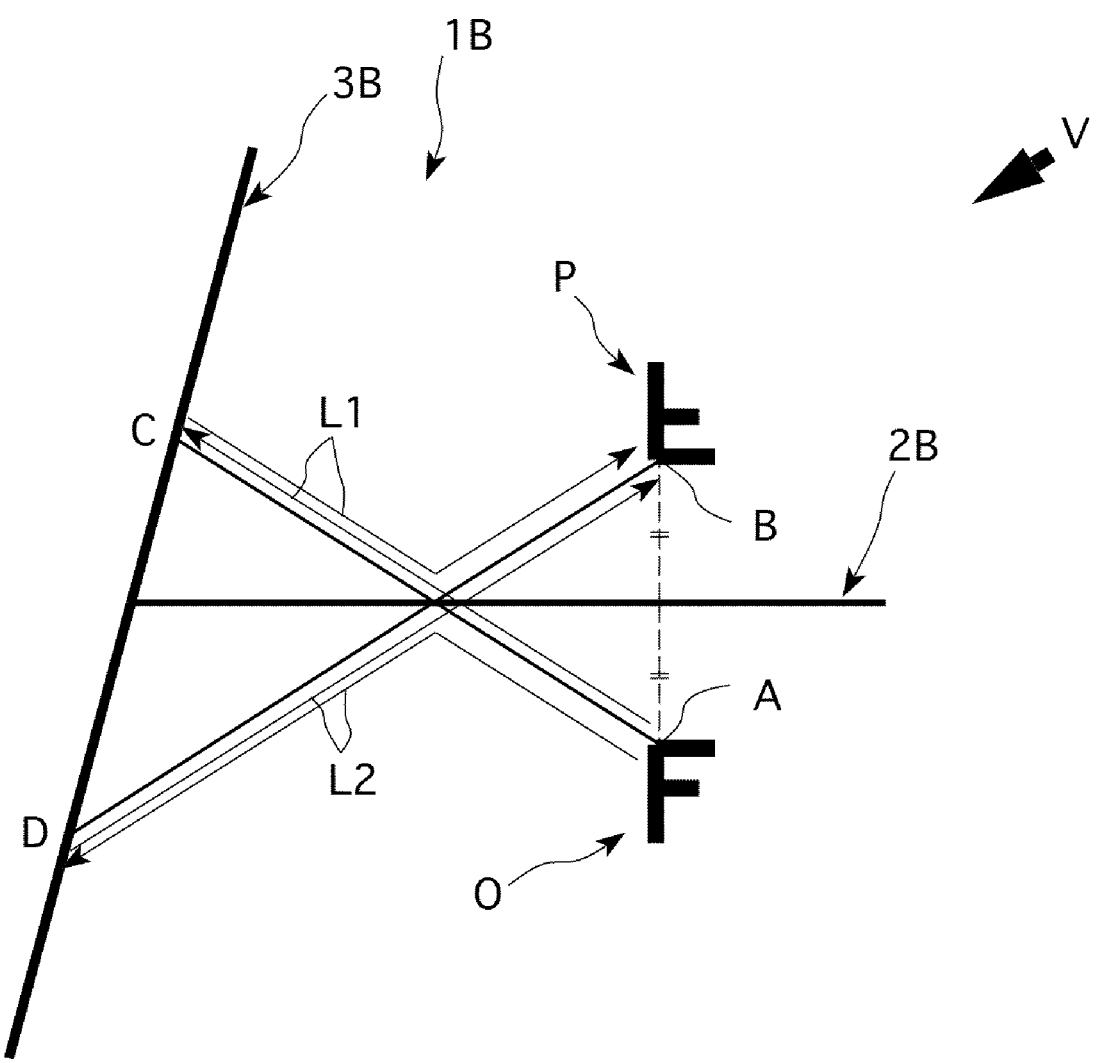
FIG. 3 is a schematic diagram of an example variation of the real mirror image forming optical system viewed from the side.

The image forming mechanism described above is the same, regardless of the position of the retroreflector 3A, or of the angle formed between it and the half-mirror 2A. That is, we shall describe as an example the case of a real mirror image forming optical system 1B as shown in FIG. 3, with one retroreflector 3B placed non-perpendicularly to one half-mirror 2B (which is equivalent to the above-mentioned 2A), at an angle. For light passing through the first optical path L1, light emitted in all directions from one point (point A) on the object to be projected O shall pass through the half-mirror 2B in a straight line, then it will be recursively reflected back into the same direction from the retroreflector 3B that is placed at the front side of the half-mirror 2B, (in FIG. 2, point C is one example of a retroreflection point), then by being further reflected from the half-mirror 2B, it will be focused into one point B that is in a planar symmetric position to point A with respect to the half-mirror surface 2B. Furthermore, for light passing through the second optical path L2, light emitted in all directions from one point (point A) on the object to be projected O shall be reflected from the half-mirror 2B, then it will be recursively reflected back into the same direction from the retroreflector 3B that is placed at the front side of the half-mirror 2B, (in FIG. 2, point D is one example of a retroreflection point), then it pass through the half-mirror 2B in a straight line, and it will be focused into one point B that is in a planar symmetric position to point A with respect to the half-mirror surface 2B. In this case, the real mirror image P being formed at the same point B is common for both light paths, but the length of the two light paths becomes like L2>L1. For this optical system, since the blurring of the image due to diffraction and machining accuracy increases with the length of the light path, the resolution of the real mirror image P obtained with the second light path L2 will be lower than the resolution of the real mirror image P obtained with the first light path L.

Figure 4:
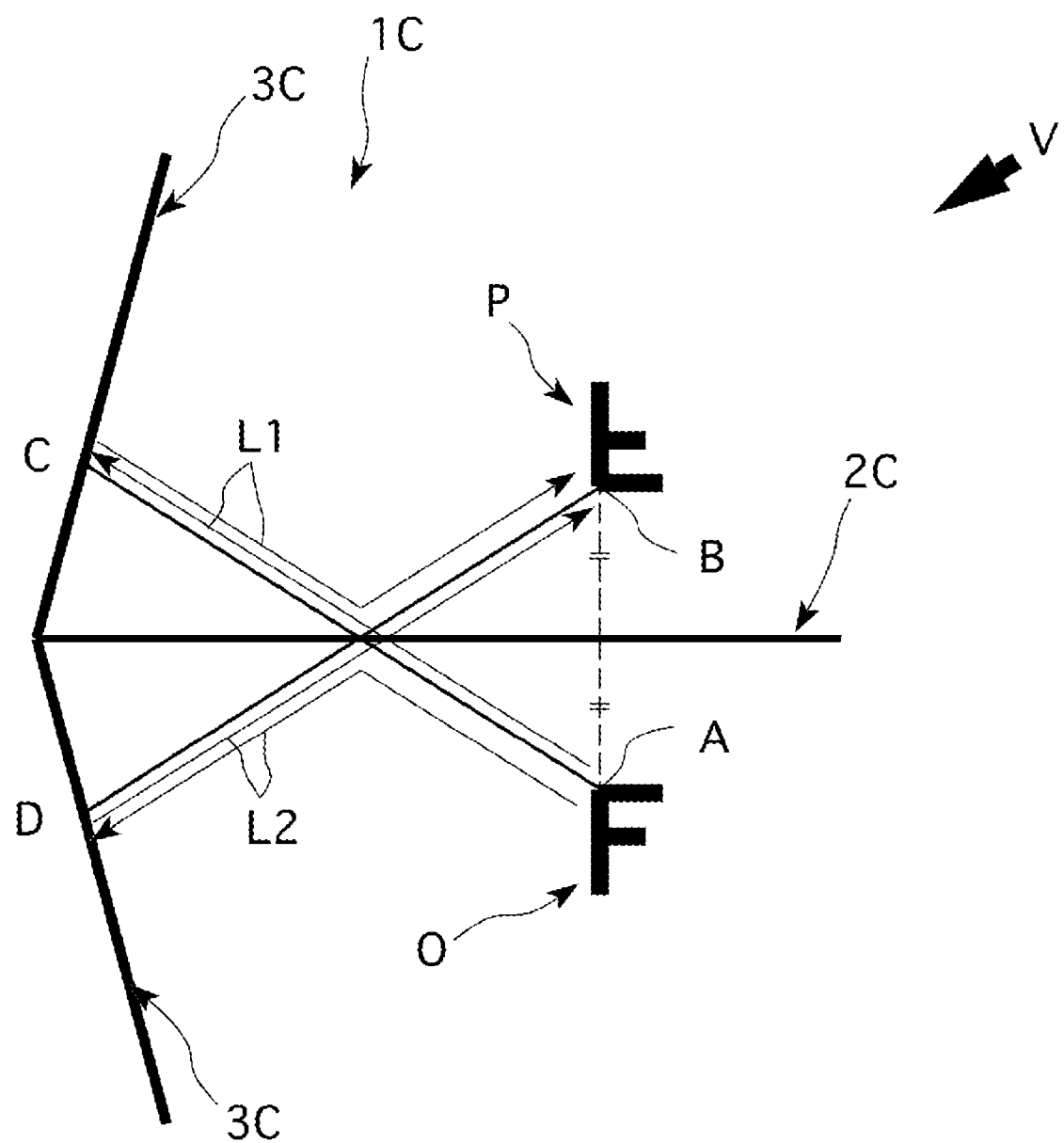
FIG. 4 is a schematic diagram of another example variation of the real mirror image forming optical system viewed from the side.

Furthermore, for the real mirror image forming optical system 1C shown in FIG. 4, where the retroreflector 3C is placed in a bent position to the front and back sides of the half-mirror 2C (equivalent to the above-mentioned half-mirror 2A), the process of image forming is again the same. In that figure, it can be regarded as if two planar retroreflectors 3C were used, one placed each to the front and back sides of the half-mirror 2C, respectively. In the example shown, the surface of the retroreflector 3C at the front side of the half-mirror 2C, and the surface of the retroreflector 3C at the back side of the half-mirror 2C are both at the same angle with respect to the surface of the half-mirror 2C. For light passing through the first optical path L1, light emitted in all directions from one point (point A) on the object to be projected O shall pass through the half-mirror 2C in a straight line, then it will be recursively reflected back into the same direction from the retroreflector 3C that is placed at the front side of the half-mirror 2C, (in FIG. 2, point C is one example of a retroreflection point), then by being further reflected from the half-mirror 2C, it will be focused into one point B that is in a planar symmetric position to point A with respect to the half-mirror surface 2C. Furthermore, for light passing through the second optical path L2, light emitted in all directions from one point (point A) on the object to be projected O shall be reflected from the half-mirror 2C, then it will be recursively reflected back into the same direction from the retroreflector 3C that is placed at the front side of the half-mirror 2C, (in FIG. 2, point D is one example of a retroreflection point), then it pass through the half-mirror 2C in a straight line, and it will be focused into one point B that is in a planar symmetric position to point A with respect to the half-mirror surface 2C. As mentioned above, the surface of the retroreflector 3C at the front side of the half-mirror 2C, and the surface of the retroreflector 3C at the back side of the half-mirror 2C are both at the same angle with respect to the surface of the half-mirror 2C, thus the length of the first light path L1 and the second light path L2 will be equal, so the resolution of the real mirror image P obtained with the second light path L2 will be the same like the resolution of the real mirror image P obtained with the first light path L1. This means that like for the examples shown in FIG. 1 and FIG. 2, if the retroreflectors 3C at the front side and the back side of the half-mirror 2C are at planar symmetric positions, the length of the first light path L1 and the second light path L2 will be equal, thus the resolution of the real mirror image P will also be the same. Furthermore, as compared with the case shown in FIG. 1 and FIG. 2, the incident and exiting light rays will be more close to perpendicular to the retroreflector 3C, thus the reflection efficiency of the retroreflector 3C will be higher for the example shown in FIG. 4, and the real mirror image P will be more uniformly lit and brighter. It should be noted that when it is allowed that the resolution of the real mirror images P due to the two light paths L1 and L2 are different, the angle of the retroreflectors 3C at the front and the back sides of the half-mirror 2C can be chosen to be different, and still the real mirror image P will be formed in the same manner at point B.

As shown above in each of the preceding drawings, even when the retroreflector 3 is placed at least to each of the front and back surfaces of the half-mirror 2 along different planes or curved surfaces, so far as a retroreflector 3 capable of reflecting back the incident light in the same direction is used, the real mirror image P of the object to be projected O will be formed certainly at a planar symmetric position with respect to the half-mirror surface 2. Moreover, the unit retroreflective elements constituting the retroreflector 3 might be distributed spatially in a three-dimensional manner, and the same result will still hold. Moreover, when only one of the two light paths L1 and L2 is to be used for image forming, it is sufficient to place the retroreflector 3 only to the front or to the back side of the half-mirror 2.

For the half-mirror 2 used as a component of the above-mentioned embodiment of the real mirror image forming optical system of the present invention, for instance a thin sheet of transparent plastic or glass with a thin reflective film coated on one of its sides might be used. By preparing the side of the thin transparent sheet that is opposite from the reflective coating with a non-reflective coating (AR coating), the doubling of the real mirror image P can be prevented. Furthermore, it might happen that the object to be projected O is directly visible through the half-mirror 2 by an observer in a position opposite to the retroreflector 3. So, taking the real mirror image forming optical system 1A shown in FIG. 2 as an example, it is possible, as an example of a shading means shown in FIG. 5, to place some opaque plate on a part of the half-mirror 2 facing the observer (the side of the viewing point V), or to cover it with a light-shading film or shading paint, in order to block the light, and thus to prevent the object to be projected O to be visible to the observer through the half-mirror 2.

Figure 5:
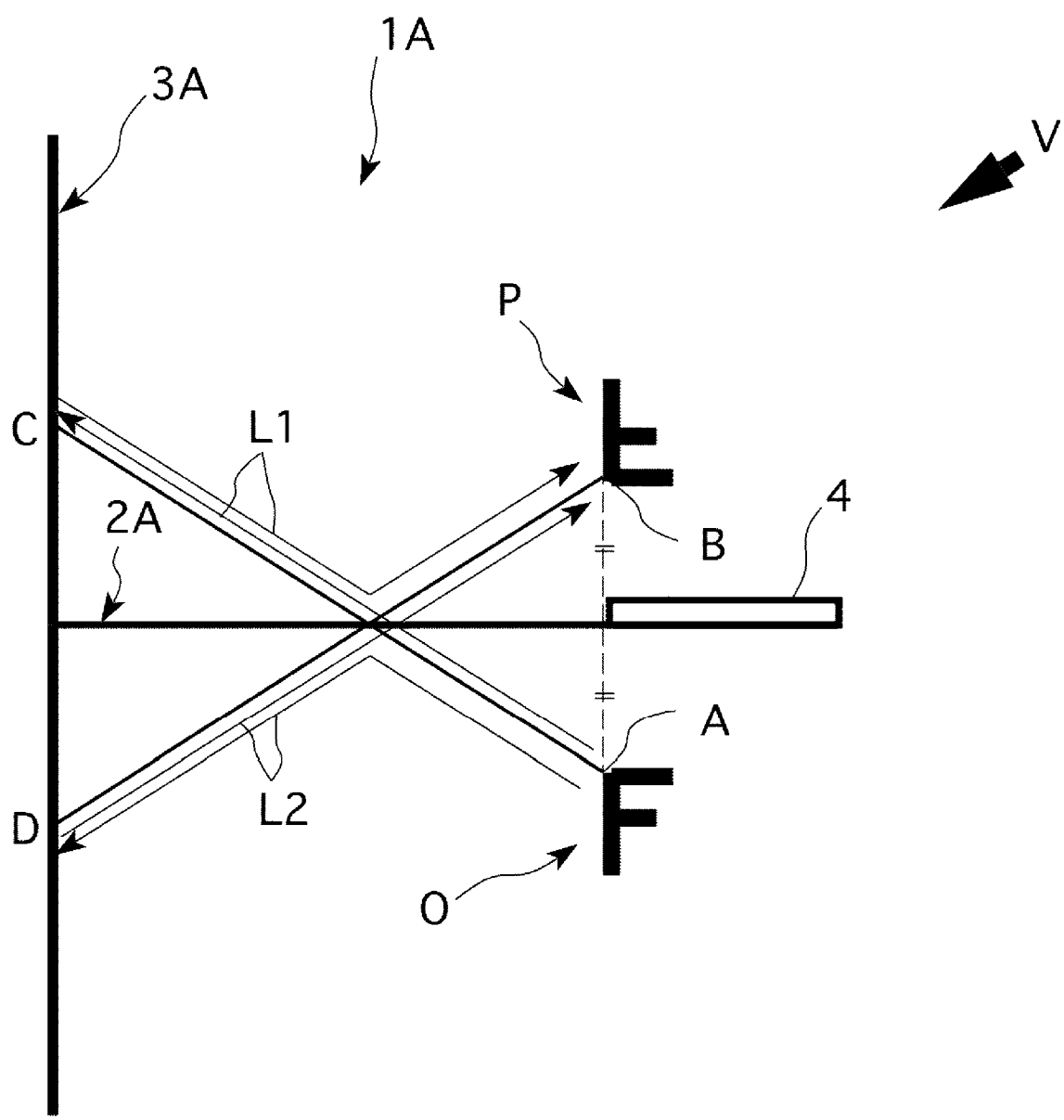
FIG. 5 is a drawing showing the status of a shading plate placed in the schematic diagram of FIG. 2.

On the other hand, for the retroreflector 3, a recursive reflector with mirror grade surface smoothness, or a reflector coated with retroreflective film or retroreflective paint, or any other means that is capable of recursively reflecting the incident light, might be used. For instance, the retroreflector 3 shown in front view in FIG. 6 (a), is a corner cube array consisting of a set of corner cubes, which are obtained as one inner corner of a cube. Each corner cube 31 that form one unit retroreflective element has three mirror surfaces 31a, 31b, and 31c, in the shape of identically shaped and sized isosceles triangles joined at a common point, showing a triangular shape when seen from the front; with those three mirror surfaces 31a, 31b, and 31c being mutually perpendicular. As shown in a three-dimensional view in FIG. 6 (b), the incident light is reflected in turn by the three mirror surfaces, resulting in the reflected light ray to be parallel to the incident light. In addition, the retroreflector 3 shown in front view in FIG. 7 (a) is also a corner cube array consisting of a set of corner cubes, which are obtained as one inner corner of a cube. Each corner cube 31' that form one unit retroreflective element has three mirror surfaces 31a', 31b', and 31c', in the shape of identically shaped and sized squares joined at a common point, showing a hexagonal shape when seen from the front; with those three mirror surfaces 31a', 31b', and 31c' being mutually perpendicular. As shown in a three-dimensional view in FIG. 7 (b), the incident light is reflected in turn by the three mirror surfaces, resulting in the reflected light ray to be parallel to the incident light. Such corner cube arrays as shown in FIGS. 4 and 5 might be manufactured for example by micro-machining an aluminum or nickel plate to mirror finish, or by electroforming a metal or plastic plate. The difference between these two types of corner cube arrays is that while the one with isosceles triangular mirrors is relatively easier to manufacture but has a slightly lower reflective efficiency; on the other hand, the one with square mirrors is somewhat more difficult to manufacture as compared with the one with isosceles triangular mirrors, but it has higher reflectivity.

In addition to the above-mentioned corner cube arrays, recursively reflecting devices with three mirror surfaces (broadly stated, 'corner reflectors') might be used as unit retroreflective elements. While it is not shown here, for instance, of three mirror surfaces, two can be perpendicular, while the third one might have an angle of 90/N degrees with the other two (here N is an integer number); or the three mirror surfaces might have mutual angles with the adjacent ones of 90 degrees, 60 degrees, and 45 degrees; such narrow-angle corner reflectors are also suitable as the unit retroreflective elements of the retroreflector 3 used for the current exemplary embodiment. In addition, cat's eye reflectors or such can also be used as the unit retroreflective elements.

The unit size of the retroreflective element is a parameter that determines the resolution of the image. From geometrical optics, since the image of a point light source is formed with a spread of about twice the size of the unit retroreflective element, it is desirable to have as small size as possible; on the other hand, from wave optics it is known that the resolution becomes worse due to diffraction with smaller sizes. Because of this, it is necessary to determine the size as a compromise between those two opposing effects. For instance, when the image is to be observed from the relatively short distance of a few tens of centimeters, a size on the order of about 50 to a few hundreds of micrometers is advantageous, while for a longer observing distance of a few meters to tens of meters, the size should be increased, to the order of a few hundreds to a few thousands of micrometers.

Furthermore, in the above descriptions the case of flat retroreflectors were explained, but as in the case of the real mirror image forming optical system 1D shown in FIG. 8, it is also possible to use a curved retroreflector 3D. In the same figure, (a) shows the real mirror image forming optical system 1D schematically from the side, and (b) shows it from the top. In this example drawing, a hollow partial globe is used as the retroreflector 3D, with a large number of retroreflective elements formed on its inner surface, and the half-mirror 2D (equivalent to the above-mentioned half-mirror 2A) is set in a horizontal position dividing the inner space into an upper and lower half. This real mirror image forming optical system 1D, similarly to the real mirror image forming optical systems 1A, 1B, and 1C, that utilized planar retroreflectors 3A, 3B, and 3D, forms the real mirror image at a planar symmetric position (B) with respect to the half-mirror surface 2D by passing the light emitted from the object to be projected O (point A) through two light paths L1 and L2; however, the angle of incidence and angle of exit of the light rays with respect to the surface of the curved retroreflector 3D (the reflective surface) is approximately perpendicular in all positions along the retroreflector 3D, thus the reflective efficiency of the retroreflector 3D is extremely high, resulting in a very wide range of visibility and high resolution.

Figure 9:
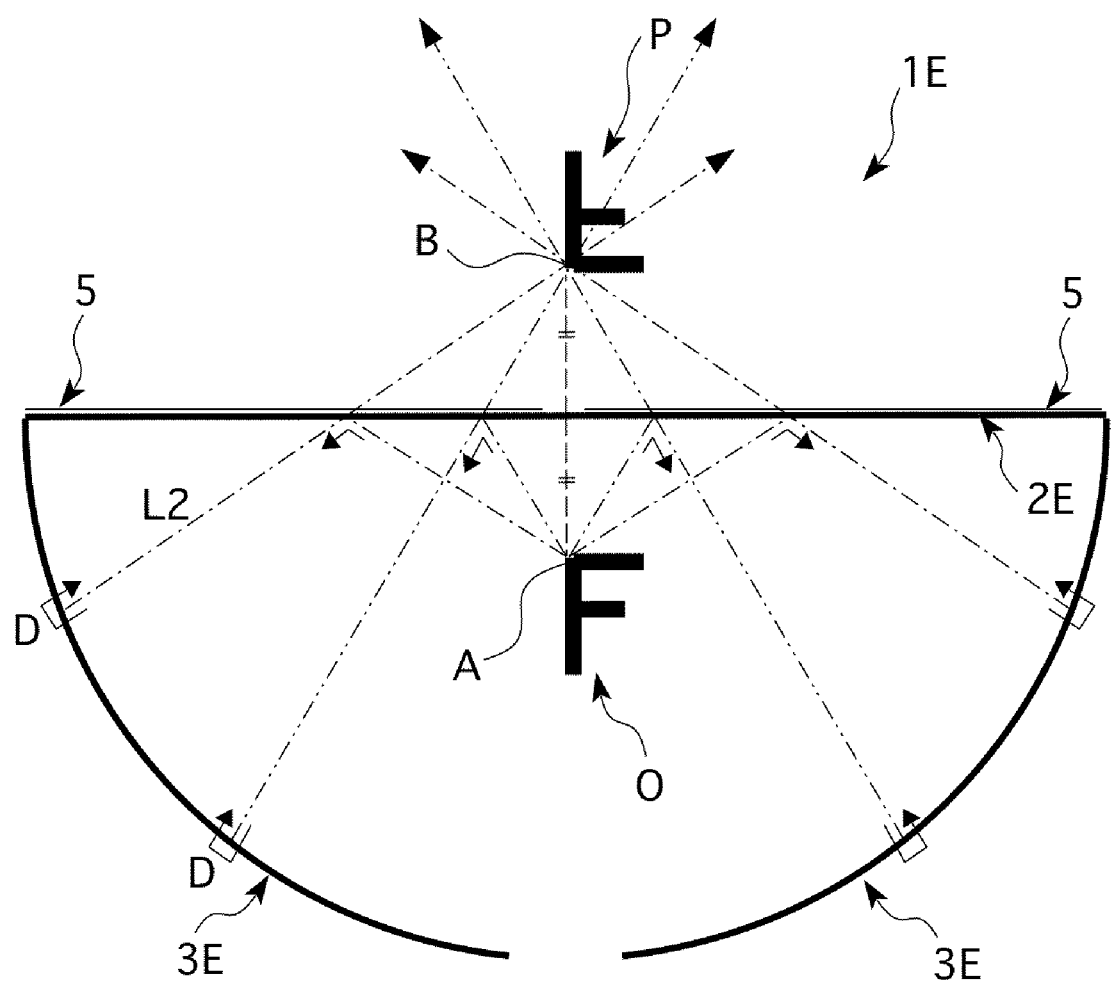
FIG. 9 is a cross-section diagram showing schematically an embodiment of a multi-view real mirror image forming optical system.

Besides the above, by changing the placement of the retroreflectors, it is possible to configure real mirror image forming optical systems with multi-view capability, that is, to enable the viewing of the real mirror image P of the object to be projected O simultaneously from many directions. FIG. 9 shows schematically one example of the real mirror image forming optical system 1E realizing the multi-view capability. This real mirror image forming optical system 1E is composed of a disk-shaped half-mirror 2E, and a hemispherical retroreflector 3E placed to the back side of the half-mirror 2E, that surround the object to be projected O. The half-mirror 2E, while its shape is different from each of the above-mentioned half-mirrors 2A through 2D, is equivalent to them. Furthermore, the top surface of the half-mirror 2E is coated with a visibility control film, or a visibility angle control film, or some similar optical film, as a means to transmit only light rays in a certain direction and block light rays in other specific directions, or to disperse light rays of a certain direction. The retroreflector 3E, like the above-mentioned retroreflector 3D, is a curved shape with a large number of unit retroreflective elements arranged on its inner surface. Since the bottom part of the retroreflector 3E right under the object to be projected O is not used for the recursive reflection of light rays, there are no unit retroreflective elements to be formed there; however, it is not a problem if unit retroreflective elements are formed there too.

In case of this real mirror image forming optical system 1E, there is no retroreflector placed at the front side of the half-mirror 2E, thus the real mirror image P is observed only due to the second light path. That is, light emitted in all directions from one point A on the object to be projected O shall be reflected from the half-mirror 2E, then it will be recursively reflected back into the same direction from the retroreflector 3E that is placed at the back side of the half-mirror 2E, (in FIG. 9, point D is one example of a retroreflection point), then it passes through the half-mirror 2E in a straight line, and it will form an image at the point B that is in a planar symmetric position to point A with respect to the half-mirror surface 2E. The light emitted from the object to be projected O straight upwards and reflected from the half-mirror 2E, will return again to the object to be projected O, and it will not be recursively reflected from the retroreflector 3E, thus because of this the bottom part of the retroreflector 3E is not going to be used for retroreflection. Therefore, the real mirror image P which is the set of the imaging points B, except for the top region of the object to be projected O, will be observable simultaneously from almost any point in space at the front side of the half-mirror 2E. Furthermore, among the light emitted from the object to be projected O, those rays that pass through the half-mirror 2E directly without having been reflected, will be blocked from reaching the point of observation by the optical film 5, thus the direct observation of the object to be projected O from the viewing point V will be prevented.

This kind of real mirror image forming optical system with multi-view capability is not limited to the embodiment described above, but as long as the object to be projected is surrounded by the half-mirror and the retroreflector, their shape and so on might be designed as desired. For example, in addition to the structure of the above real mirror image forming optical system 1E according to FIG. 9, by adding to the front side of the half-mirror 2E another retroreflector 3E similar to the one on the back side, it becomes possible to increase the brightness of the real mirror image P by making use of the first light path too. However, as for the retroreflector 3E at the front side, by taking into account the need to observe the real mirror image P from the same side, its height from the half-mirror 2E must be determined at a sufficient level in order to allow space for the observation point.

The invention is not limited to the embodiment described above, also the specific details of the half-mirrors, retroreflectors, or such other component parts shall not be limited to the above-mentioned embodiments or examples, but might be determined in many similar ways in accordance with the essence of the present invention.

INDUSTRIAL APPLICABILITY

The real mirror image forming optical system of the present invention can project the real mirror image of an object to be projected as a floating image, enabling application in video equipment with user interactive capabilities, for attractions, educational equipment, medical equipment and other such fields.

I claim:

1. A real mirror image forming optical system, comprising: a half-mirror, and
a retroreflector comprising a set of unit retroreflective elements placed in such positions where the light transmitted through said half-mirror, or reflected by said half-mirror, is recursively reflected by them;
wherein light, emitted from an object to be projected placed at the back side of said half-mirror, passes through said half-mirror, then it is recursively reflected from said unit retroreflective elements, then it is reflected from the front side of said half-mirror, thus forming a first light path;
or light, emitted from an object to be projected placed at the back side of said half-mirror, is reflected from the back side of said half-mirror, then it is recursively reflected from said unit retroreflective elements, then it passes through said half-mirror, thus forming a second light path; and light passing through one or both of said light paths forms the real mirror image of the object to be projected at a planar symmetric position with respect to the surface of said half-mirror, wherein said unit retroreflective elements constituting said retroreflector are arranged along a common curved surface.

2. A real mirror image forming optical system according to claim 1, wherein said retroreflector is arranged either on the front side of said half-mirror, or on the back side of said half-mirror, or on both sides.

3. A real mirror image forming optical system according to claim 1, further comprising a shading means, wherein said shading means shades the area of real mirror image with respect to both of said light paths 1 and 2 on the side of the observer.

4. A real mirror image forming optical system according to claim 1, wherein said retroreflector is arranged in a way so that at least on the back side of said half-mirror, taken together with said half-mirror they surround said object to be projected in a three-dimensional manner.

5. A real mirror image forming optical system according to claim 1, further comprising on the front surface of said half-mirror an optical visibility control means capable of transmitting, blocking, or diffusing light rays of specific directions, wherein said visibility control means is arranged in a way so that it blocks light rays in the direction of viewing directly said object to be projected through said half-mirror from viewing points along the space in front of said half-mirror.

6. A real mirror image forming optical system according to claim 1, wherein said unit retroreflective element comprises three adjacent mutually perpendicular mirror surfaces.

7. A real mirror image forming optical system according to claim 6, wherein said unit retroreflective element is a corner cube comprising three adjacent mutually perpendicular mirror surfaces.

8. A real mirror image forming optical system according to claim 6, wherein said unit retroreflective element comprises three adjacent mirror surfaces, with two of the angles between said adjacent mirror surfaces being 90 degrees, while the third angle is 90/N degrees, where N is an integer.

9. A real mirror image forming optical system according to claim 6, wherein said unit retroreflective element is an acute angle retroreflector, comprising three adjacent mirror surfaces, with the three angles between said adjacent mirror surfaces being 90 degrees, 60 degrees, and 45 degrees.

10. A real mirror image forming optical system according to claim 6, wherein said retroreflective elements constituting said retroreflector are constructed in a manner so that while said mutual angles between adjacent mirror surfaces in each individual retroreflective element are maintained as stated above, the directions of said retroreflective elements are arbitrary.

11. A real mirror image forming optical system according to claim 1, wherein said unit retroreflective element is a cat's eye retroreflector.

* * * * *